(12) United States Patent
Huck et al.

(10) Patent No.: US 9,035,577 B2
(45) Date of Patent: May 19, 2015

(54) METHOD FOR OPERATING A CLOSING DEVICE, AND A CLOSING DEVICE

(75) Inventors: Thomas Huck, Rheinmuenster (DE); Peter Kusserow, Buehl (DE); Matthias Koerwer, Buehlertal (DE)

(73) Assignee: Robert Bosch GmbH, Stuttgart (DE)

( * ) Notice: Subject to any disclaimer, the term of this patent is extended or adjusted under 35 U.S.C. 154(b) by 277 days.

(21) Appl. No.: 13/640,930

(22) PCT Filed: Apr. 6, 2011

(86) PCT No.: PCT/EP2011/055355
§ 371 (c)(1),
(2), (4) Date: Dec. 18, 2012

(87) PCT Pub. No.: WO2011/128238
PCT Pub. Date: Oct. 20, 2011

(65) Prior Publication Data
US 2013/0093365 A1    Apr. 18, 2013

(30) Foreign Application Priority Data
Apr. 14, 2010  (DE) .......................... 10 2010 027 746

(51) Int. Cl.
*F04D 15/00*    (2006.01)
*H02P 31/00*    (2006.01)
(Continued)

(52) U.S. Cl.
CPC ............ *H02P 31/00* (2013.01); *E05F 15/0008* (2013.01); *E05F 15/1684* (2013.01);
(Continued)

(58) Field of Classification Search
USPC ............... 318/3, 9, 464, 266, 286, 469; 160/6
See application file for complete search history.

(56) References Cited

U.S. PATENT DOCUMENTS

| 2010/0037523 A1 | 2/2010 | Oirsouw et al. |
| 2010/0228446 A1 | 9/2010 | Schulter et al. |
| 2012/0261078 A1* | 10/2012 | Adams et al. ...................... 160/6 |

FOREIGN PATENT DOCUMENTS

| CN | 101490356 | 7/2009 |
| DE | 10325888 | 12/2004 |

(Continued)

OTHER PUBLICATIONS

International Search Report for Application No. PCT/EP2011/055355 dated Jul. 21, 2011 (English Translation and Original, 4 pages).

*Primary Examiner* — Karen Masih
(74) *Attorney, Agent, or Firm* — Michael Best & Friedrich LLP

(57) ABSTRACT

The invention relates to a method for operating a closing device, wherein a closing element (2), with the aid of a drive motor (4) controlled by a control unit (7), can be displaced in a closing direction up against a stop edge, wherein the control unit (7) can be shifted into a normal-operation mode, in which position-related information is sensed as the current position of the closing element (2), and into a sleeping mode, in which no sensing of position-related information takes place, the method having the following steps: —interrogating whether a wake-up condition, in which the control unit (7) goes from the sleep mode into the normal-operation mode, is present; —if the presence of the wake-up condition is established, and if the closing element (2), prior to assuming the sleep mode, last moved in the closing direction, the position-related information is subjected (S25) to a predetermined correction value in order to correct the position-related information, in respect of an actual position of the closing element (2), into an opening direction.

9 Claims, 2 Drawing Sheets

(51) Int. Cl.
*E05F 15/00* (2006.01)
*E05F 15/16* (2006.01)
(52) U.S. Cl.
CPC ........ *E05Y2400/452* (2013.01); *E05Y 2900/55* (2013.01); *E05Y 2400/342* (2013.01); *E05Y 2400/508* (2013.01)

(56) References Cited

FOREIGN PATENT DOCUMENTS

FR 2900186 10/2007
JP 09175167 7/1997

\* cited by examiner

METHOD FOR OPERATING A CLOSING DEVICE, AND A CLOSING DEVICE

BACKGROUND OF THE INVENTION

The present invention relates to automatic closing devices, such as, for example, automatic window lifters and roof closing installations in a motor vehicle, which are equipped with a pinch protection function and in which the control can receive a sleep mode.

Automatic closing devices usually have a closing element (window pane, sliding roof) which is driven electrically by electric motor. The electric motor is activated by a control unit which is coupled to an operating element, in order, as a function of actuation of the operating element, to activate the electric motor and to stipulate its direction of movement.

In closing devices on a motor vehicle, such as, for example, electric window lifters, electric sliding roofs and the like, it is necessary to ensure that no articles or body parts which may be damaged or injured are present during a closing action in which the closing element is moved in the direction of a stop edge (window frame, roof recess). In order to avoid such a situation, a control unit implements an algorithm which detects a pinching situation during a closing action of the closing element. When the pinching situation is detected, the closing action is interrupted or reversing is executed, in which the closing element at least briefly performs an opening movement.

The closing device is usually activated with the aid of the operating element, and, depending on the type of operation of the operating element, an automatic run may be activated, in which the closing element moves automatically in the opening direction or the closing direction, without the operating element having to remain actuated. In an automatic run mode, the automatic run can be activated for a specific time duration, for example when the operating element is actuated.

As a rule, to reduce the quiescent current in the control unit, what is known as a sleep mode is implemented, in which the control unit is essentially inoperative as long as the electric motor is switched off, no movement of the closing element in the opening or the closing direction is carried out and no further actuation of the operating element takes place. This serves for reducing the quiescent current consumption as far as possible, until the control unit is shifted into a normal operating mode by a wake-up signal.

Furthermore, particularly in the case of automatic window lifters, a function is implemented in which the pinch protection function is deactivated shortly before a complete closing position, in which the closing element bears against the stop edge, is reached. As a rule, the stop edge against which the closing element is moved is provided with a seal, so that, during a closing action, the resistance increases shortly before the closing element impinges on the stop edge. Deactivating the pinch protection function in this region ensures that a pinching situation is not wrongly detected when the closing element moves into the seal.

Whereas, in earlier systems, selflocking mechanisms were employed for moving the closing element, appreciable use is made of non-selflocking mechanisms for the purpose of improving efficiency. In order to block the closing element against manual movement of the closing element, suitable measures are usually provided which prevent the electric motor from being rotated manually. In spite of such measures for performing manual movement of the closing element, it may happen that the electric motor and the closing element can be moved a short distance before blocking commences.

If, during such an externally triggered movement of the closing element, the control unit is in the sleep mode, during which position detection for the closing element is inactive, maladjustment will therefore occur between position information stored in the control unit for the last-detected position of the closing element and the current position of the closing element. Particularly during a closing movement of the closing element, before which an externally triggered movement of the closing element has taken place in a preceding phase of a sleep mode, it may happen, in the case of such maladjustment, that the pinch protection function is deactivated too soon before the stop edge is reached and therefore there is no effective pinch protection active in this region. In other words, in such a situation, pinch protection is deactivated, even though the closing system has between the closing element and the stop edge an interspace which is sufficiently wide that articles or body parts may enter it and may be damaged or injured.

SUMMARY OF THE INVENTION

The subject of the present invention is to make available a method and a closing device in which the risk of pinching in the event of maladjustment of the position information of the closing element in relation to an actual position of the closing element is reduced.

According to a first aspect, a method for operating a closing device is provided, a closing element being movable in a closing direction against a stop edge with the aid of a drive motor controlled by a control unit, the control unit being shiftable into a normal operating mode, in which position information is detected as the current position of the closing element, and into a sleep mode, in which no detection of the position information is carried out. The method comprises the following steps:

interrogation as to whether a wake-up condition is present in which the control unit changes over from the sleep mode to the normal operating mode;

when the presence of the wake-up condition is established and when the closing element last moved in the closing direction before the assumption of the sleep mode, loading of the position information with a stipulated correction value, in order to correct the position information with respect to an actual position of the closing element in an opening direction.

One idea of the above method is that, after the assumption of a sleep mode after movement of the closing element in the closing direction, position information for a position of the closing element is loaded with a correction value in order at least partially to compensate for any undetected displacement of the closing element during the sleep mode in the opening direction. The result of loading with the correction value is that the position information is adapted in an opening direction, so that, as compared with uncorrected position information, the deactivation of the pinch protection during a closing movement, shortly before an edge of the closing element runs into a seal at the stop edge, takes place later. The situation can thus be avoided where, due to a displacement in adjustment between the position information and the actual position, the region between the closing element and the stop edge is increased and therefore the deactivation of the pinch protection function may take place too early.

Furthermore, the position information can be corrected by a stipulated correction value only when the closing element has moved in the closing direction before the assumption of the sleep mode.

According to one embodiment, the position information can be corrected by the stipulated correction value only when, after calibration in which the position information is calibrated to the actual position of the closing element, a number of wake-up operations from the sleep mode which overshoots a stipulated threshold value has taken place.

Moreover, calibration can be carried out when it is established that, during a closing movement, the closing element is moved against the stop edge.

In particular, when the presence of the wake-up condition is established and when the closing element last moved in the opening direction before the assumption of the sleep mode, no loading with a correction value can be carried out.

There may be provision for the wake-up condition to comprise actuation of an operating element for closing and/or opening.

According to a further embodiment, a pinch protection function, which causes an automatic switch-off of the drive motor when a pinching situation is detected, can be deactivated when the position information indicates that the clearance between an edge, opposite the stop edge, of the closing element and the stop edge corresponds to less than a stipulated clearance.

According to a further aspect, a closing device, in particular an automatic window lifter system, is provided. The closing device comprises:

a closing element which is movable in a closing direction against a stop edge with the aid of a drive motor, a control unit for operating the drive motor; the control unit being shiftable into a normal operating mode, in which position information is detected as the current position of the closing element, and into a sleep mode, in which no detection of the position information is carried out, the control unit, furthermore, being designed;

in order to interrogate as to whether a wake-up condition is present in which the control unit changes over from the sleep mode to the normal operating mode;

in order, when the presence of the wake-up condition is established and when the closing element last moved in the closing direction before the assumption of the sleep mode, to load the position information with a stipulated correction value, in order to correct the position information with respect to an actual position of the closing element in an opening direction.

According to a further aspect, a computer program product is provided which contains a program code which, when it is executed on a data processing device, carries out the above method.

BRIEF DESCRIPTION OF THE DRAWINGS

Preferred embodiments are explained in more detail below by means of the accompanying drawings in which.

DETAILED DESCRIPTION

Figure 1:
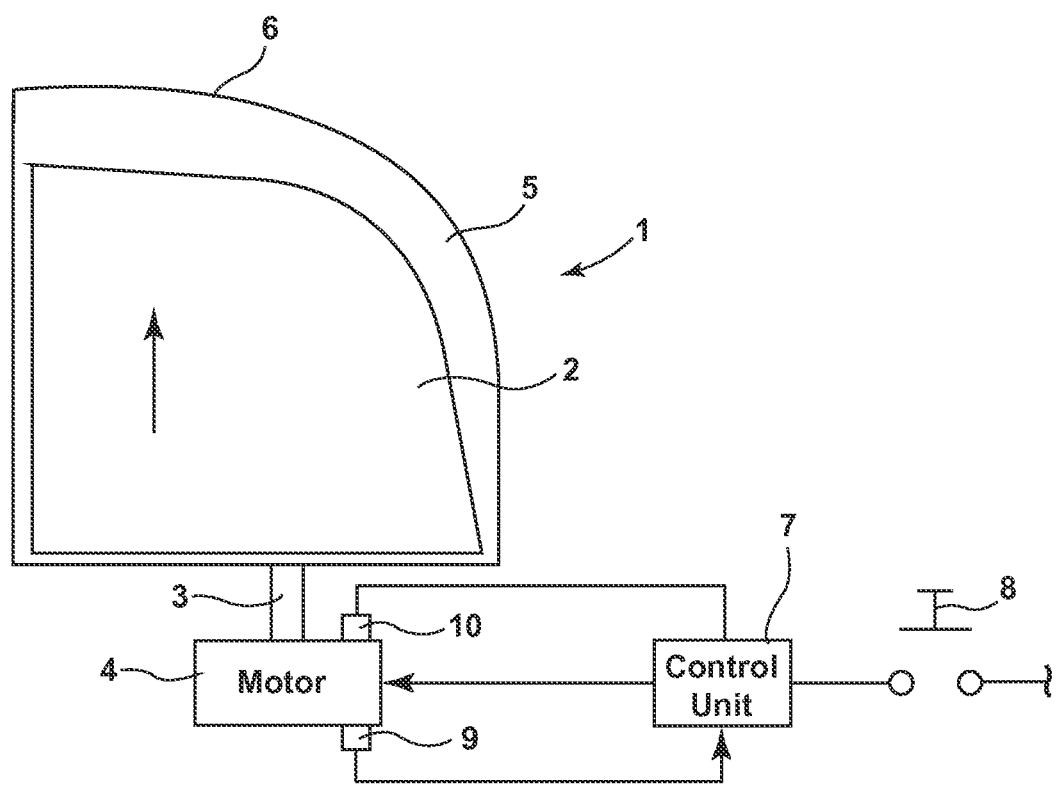
FIG. 1 shows a diagrammatic illustration of an automatic window lifter in a motor vehicle.

FIG. 1 illustrates an automatic window lifter system 1 for a side window of a motor vehicle, in which a window pane 2 can be moved as a closing element in a window frame 5 with the aid of a closing mechanism 3. The window pane 2 is driven by an electric motor 4 via the closing mechanism 3 which may comprise a suitable gear. In the present exemplary embodiment, the window pane 2 is moved upward (in the direction of the arrow) in order to close the window, the window pane 2 reaching a closing position at a stop edge 6 of the window frame 5.

The electric motor 4 is activated by a control unit 7 as a function of actuation of an operating element 8, so that the window pane 2 moves in a stipulated direction. For example, when the operating element 8 is actuated in order to close the window, the window pane 2 can be moved upward, that is to say in a closing direction, as a result of rotation of the electric motor 4, so that the window pane 2 executes a closing movement. In a similar way, when the operating element 8 is actuated in order to open the window, the window pane 2 can be moved downward, that is to say in an opening direction, as a result of opposite rotation of the electric motor 4, so that the window pane 2 executes an opening movement.

Furthermore, it is possible, by actuating the operating element 8 in a specific way, to activate an automatic run mode in which, even after the actuation of the operating element 8 has ceased, the previously stipulated movement of the window pane 2 is continued either until the operating element 8 is actuated anew or until the window pane 2 has reached a stop position in a completely open or completely closed position.

Furthermore the electric motor 4 or the closing mechanism 3 may be provided with a position transmitter 9 which can detect a relative change in position of a movement of the window pane 2. In particular, during rotation of the electric motor 4, the position transmitter 9 can emit, correspondingly to the rotational movement, pulses which can be used for incrementing or decrementing a position counter implemented in the control unit 7. The respective counter value of the position counter then constitutes position information for a position of the window pane 2. Alternatively, instead of the position transmitter 9 on the electric motor 4 or on the closing mechanism 3, a current profile of motor current of the electric motor 4 may be evaluated, in order to detect a relative change in position of the electric motor 4 and consequently a relative change in position of the position of the window pane 2 and in order to provide position information by adding up the position changes.

A pinch protection function which detects a pinching situation on the basis of motor characteristic quantities is implemented in the control unit 7. A pinching situation is present when an article or a body part comes between a window edge, opposite the stop edge, of the window pane 2 and the window frame 5 and force is exerted upon the article or the body part as a result of a closing movement of the window pane 2. For this purpose, one or more sensors 10 may be attached to the electric motor 4, so that the profile of the motor current and/or the profile of the motor rotational speed can be detected. On the basis of the profile of the motor current or of the motor rotational speed, an increase in the drive torque required for moving the window pane 2 can be established, and this can be interpreted as a pinching situation.

Furthermore, to reduce the quiescent current consumption, the control unit 7 is shifted into what is known as a sleep mode which can be assumed whenever the window pane 2 is not moved (that is to say, the electric motor 4 does not have to be activated by the control unit 7) and the operating element 8 is not actuated. In the sleep mode, the control unit 7 is virtually inoperative, so that no updating of the position counter takes place and therefore no current position information for a position of the window pane 2 is available. When the operating element 8 is actuated and/or when a further wake-up condition, for example switched-on ignition and the like, is present, the control unit 7 is activated such that it leaves the sleep mode and changes over to a normal operating mode and activates the electric motor 4 correspondingly for the purpose of closing or opening the window.

Figure 2:
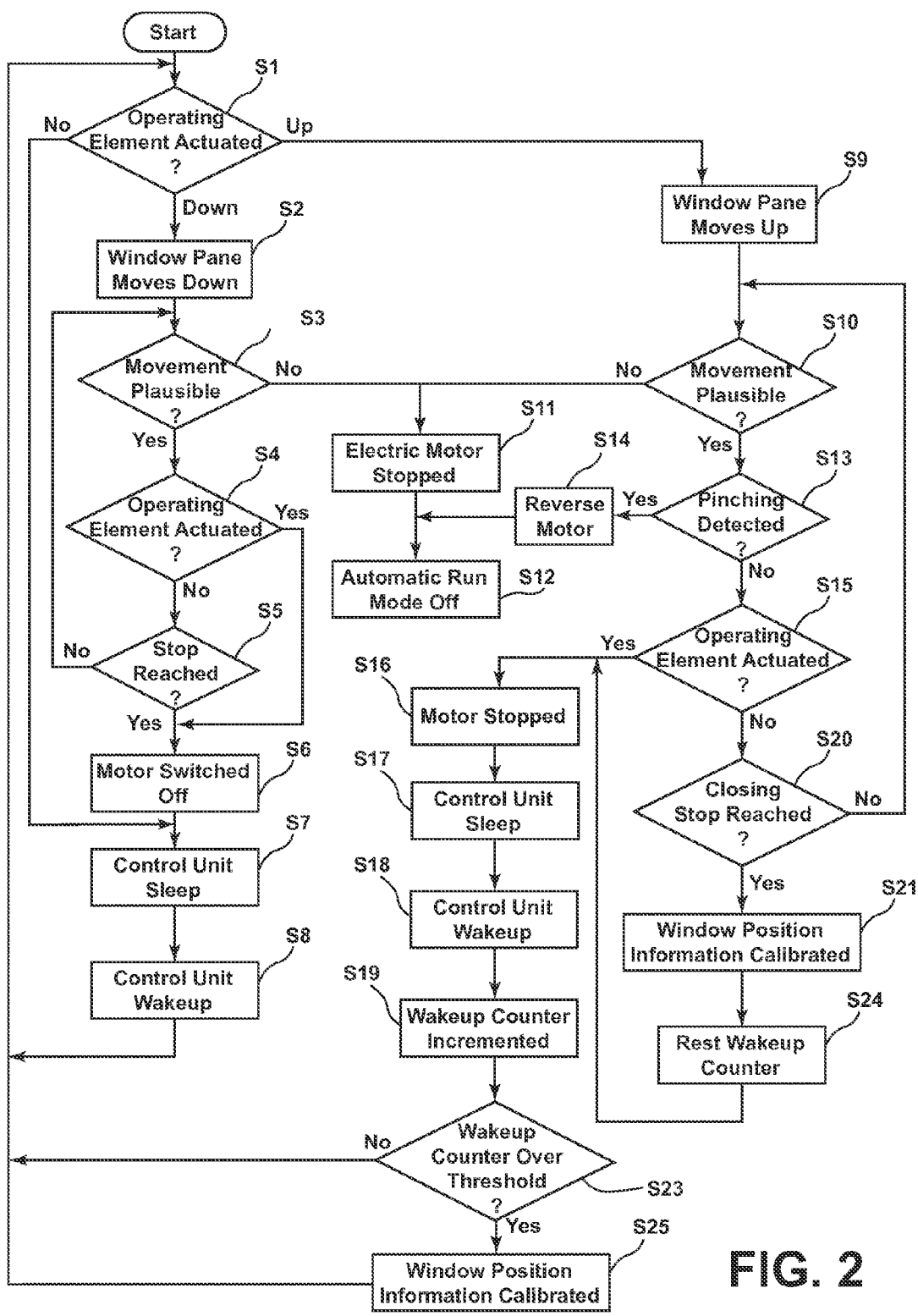
FIG. 2 shows a flowchart to illustrate the method sequence for operating the automatic window lifter.

FIG. 2 illustrates a flow chart to make clear a method for operating an automatic window lifter system.

In a step S1, a check is made as to whether the operating element 8 has been actuated for an automatic run or not. If the operating element 8 has been actuated in step S1 in order to move the window pane 2 downward, that is to say into an open position (alternative: Down) in an automatic run, that is to say, even when the actuation of the operating element 8 ceases), in step S2 a movement of the window pane 2 downward is started in that the control unit 7 activates the electric motor 4 correspondingly. The movement of the window pane 2 is checked for plausibility in step S3, that is to say a check is made as to whether the position information indicating the position of the window pane 2 lies within a plausibility range or not. If the position information lies with the plausibility range (alternative: yes), in a step S4 a check is made as to whether the operating element 8 has been actuated in order to switch off the movement of the window pane 2. If the operating element 8 has not been actuated (alternative: no), a check is made in step S5 as to whether a stop has been reached in the opening position. This may be established, for example by monitoring a motor current or by suitable sensors on the window frame 5. If it is established in step S5 that the stop is not yet reached in the opening position (alternative: no), there is a return to step S3.

If it is established in step S4 that the operating element 8 has been actuated (alternative: yes) or if it is established in step S5 that the stop has been reached in the opening position (with the window pane 2 opened to the maximum) (alternative: yes), the electric motor 4 is switched off by the control unit 7 in a subsequent step S6.

The control unit 7 is shifted into a sleep mode in a following step S7. A wake-up from the sleep mode according to a step S8 may be provided, for example, when the operating element 8 is actuated anew or another system event has occurred which corresponds to a wake-up condition. In this case, the sleep mode of step S7 is left and there is a return to step S1.

If is established in S1 that the operating element 8 has been actuated for moving the window pane 2 in an automatic run in a closing direction (alternative: Up), then, in a similar way to step S2, in a step S9 a movement of the window pane 2 upward (in the closing direction) is started, in that the control unit 7 activates the electric motor 4 correspondingly. In a subsequent step S10, a check is made correspondingly to step S3 as to whether information indicating the position of the window pane 2 is plausible.

If it is established in step S10 or step S3 (alternative: no) that the position information indicated is not plausible, the electric motor 4 is immediately stopped by the control unit 7 in step S11. In a following step S12, the automatic run mode, which allows an automatic movement of the window pane 2 even after the release of the operating element 8, is switched off. After the automatic run mode has been switched off, the window pane 2 can still be moved but only in a semi-automatic operation, in that the electric motor can be switched on or off immediately with the aid of the operating element 8.

If it is established in step S10 that the position information is plausible (alternative: yes), in step S13, a motor characteristic quantity, such as, for example, rotational speed or motor current and the like, is checked as to whether a pinching situation is present. A pinching situation can be detected, for example, as a result of an unexpected decrease in the rotational speed or an unexpected rise in the motor current. Methods for evaluating the rotational speed and motor current profiles in order to detect a pinching situation or to distinguish a pinching situation from sluggishness as sufficiently known from the prior art and are not explained in any more detail herein.

If a pinching situation has been detected (alternative: yes), in step S14 the electric motor 4 is reversed for a stipulated time duration and the window pane 2 is thereby moved in the opening direction in order to free a possibly pinched article or possibly pinched body part from the pinched state. Furthermore, according to step S12, the automatic run mode is subsequently deactivated.

If no pinching situation is established in step S3 (alternative: no), a check is made in a step S15 as to whether the operating element 8 has been actuated in order to stop the movement of the window pane 2. If this is so (alternative: yes), in a step S16 the electric motor 4 is stopped by the control unit 7, so that the window pane 2 is halted in the instantaneous position. Thereafter, in step S17, the control unit 7 is shifted into a sleep mode.

As described above, the control unit 7 is shifted from the sleep mode back into a normal operating mode only when the operating element 8 has been actuated anew or when another system event which fulfills a wake-up condition has occurred.

If no actuation of the operating element 8 has been established in step S15 (alternative: no), a check is made in step S20 as to whether a stop has been reached in the closing position. This may have taken place, for example, when a upper edge of the window pane 2 impinges onto the stop edge of the window frame 5. Alternatively, the closing position may also be detected when the edge of the window pane 2 moves into a seal on the window frame 5 even before the edge of the window pane 2 impinges onto the window frame 5. If reaching of the stop in the closing position is detected (alternative: yes), the position information on the position of the window pane 2 is calibrated in step S21 and the electric motor 4 is stopped in the following step S16. If no reaching of the stop in the closing position is detected (alternative: no), there is a return to step S10.

According to one embodiment, then, there may be provision whereby, after the wake-up of the control unit 7 in a step S18 from the sleep mode which has been assumed in step S17, the position information indicating the position of the window pane 2 is loaded with a correction value (for example, by addition) (step S25), so that the position information is corrected to the effect that it indicates a greater open position of the window pane 2 after the correction than without correction, that is to say the corrected position information indicates a greater width of an interspace between the window frame and the upper edge, opposite the window frame, of the window pane 2 or a greater clearance between the stop edge of the window frame and the window pane 2.

The correction value may be stipulated or adapted. So as not to carry out a correction with the correction value immediately after a calibrating operation has just taken place in step S21 and so as not thereby to immediately falsify the effect of calibration, a wake-up counter is implemented which is incremented in a step S19 during each wake-up operation of step S18. In step S23, it is interrogated as to whether the wake-up counter has overshot a specific stipulated threshold value. If this is not so (alternative: no), there is a return to step S1 in order to establish whether the operating element 8 has been actuated in order to move the window pane 2 in a closing or an opening direction. The wake-up counter is reset in a step S24 which is arranged between the calibration step S21 and the step S16 for stopping the electric motor.

If the stipulated threshold value has been reached in step S23 (alternative: yes), in step S25 the position information is loaded with the correction value and there is a subsequent return to step S1. If the wake-up counter is used, a further step S24 is provided after step S21, in order to reset the wake-up counter so as thereby to implement the function whereby loading with the correction value does not take place immediately after calibration of the position information. The fixing of the correction value and of the stipulated threshold value for the wake-up counter can be applied virtually as desired, depending on the customer's wishes. For example, the correction value may correspond to a value which corresponds to a position change of 1 mm of the window pane 2. In particular, the correction value may be fixed as a value of between 0.5 and 2 mm. The threshold value for the wake-up counter may correspond to 2, so that, immediately after a sleep mode, loading with a correction value does not take place after calibration of the position information.

Loading the position information with the correction value can more reliably prevent the situation where rotation of the electric motor 4 or movement of the window pane 2 during a sleep mode results in maladjustment between the window pane 2 and the position information stored in the control unit 7. To be precise, such maladjustment could result in the pinch protection function being deactivated even when the window pane 2 is in a position in which it is possible that an article or a body part can still come between the window pane 2 and the window frame 5. In order to avoid this, there is provision whereby as a precaution, after each sleep mode which follows a closing action, a collection value is applied which reduces the region in which the pinch protection function is deactivated shortly before the stop edge is reached in the closing position.

If this correction of the position information is carried out too often, without an actual displacement of the window pane 2 or of the electric motor 4 having occurred in the sleep mode, the result of this may be that, during a closing movement, the window pane is moved against the stop edge in the closing position, even though the position information still indicates an existing interspace. This will lead to faulty reversal in which the window pane 2 is moved at a specific regulating distance in the opening direction and the automatic run mode is deactivated. At the same time, the user is afforded the possibility of moving the window pane 2 manually in the direction of the closing position by the renewed actuation of the operating element 8 in order to close the window pane 2, in which case the position information of the window pane 2 when it comes to a stop in the closing position can be calibrated anew. After such calibration, the automatic run mode can be activated anew.

The pinch protection function is deactivated, as a rule, shortly before the window pane 2 comes to a stop near the closing position, for example to move the window pane 2 merely into a seal on the window frame 5, without the window pane 2 butting against the window frame 5. Thus, quiet closing of the window pane 2 can be implemented and the load upon the mechanical system of the closing mechanism can be reduced considerably. Since the resistance against the movement of the window pane 2 usually rises when the latter moves into the seal, it is necessary to deactivate the pinch protection function for this situation. The usually takes place even when there is still a specific clearance between the seal and the window pane 2, that is to say before the seal is reached. The clearance may amount, for example, to 4 mm.

The invention claimed is:

1. A method for operating a closing device, a closing element being movable in a closing direction against a stop edge with the aid of a drive motor controlled by a control unit, the control unit being shiftable into a normal operating mode, in which position information is detected as the current position of the closing element, and into a sleep mode, in which no detection of the position information is carried out, with the following steps:
   interrogation as to whether a wake-up condition is present in which the control unit changes over from the sleep mode to the normal operating mode;
   when the presence of the wake-up condition is established and when the closing element last moved in the closing direction before the assumption of the sleep mode, loading of the position information with a stipulated correction value, in order to correct the position information with respect to an actual position of the closing element in an opening direction.

2. The method according to claim 1, the position information being corrected by a stipulated correction value only when the closing element has moved in the closing direction before the assumption of the sleep mode.

3. The method according to claim 1, the position information being corrected by the stipulated correction value only when, after calibration in which the position information is calibrated to the actual position of the closing element , a number of wake-up operations from the sleep mode which overshoots a stipulated threshold value has taken place.

4. The method according to claim 3, calibration being carried out when it is established that, during a closing movement, the closing element is moved against the stop edge.

5. The method according to claim 1, no loading with a correction value being carried out when the presence of the wake-up condition is established and when the closing element last moved in the opening direction before the assumption of the sleep mode.

6. The method according to claim 1, the wake-up condition comprising actuation of an operating element for closing and/or opening.

7. The method according to claim 1, a pinch protection function, which causes an automatic switch-off of the drive motor when a pinching situation is detected, being deactivated when the position information indicates that the clearance between an edge, opposite the stop edge, of the closing element and the stop edge corresponds to less than a stipulated clearance.

8. A closing device for an automatic window lifter system, the closing device comprising:
   a closing element which is movable in a closing direction against a stop edge with the aid of a drive motor,
   a control unit for operating the drive motor; the control unit being shiftable into a normal operating mode, in which position information is detected as the actual position of the closing element, and into a sleep mode, in which no detection of the position information is carried out, the control unit, furthermore, being designed:
   in order to interrogate as to whether a wake-up condition is present in which the control unit changes over from the sleep mode to the normal operating mode;
   in order, when the presence of the wake-up condition is established and when the closing element last moved in the closing direction before the assumption of the sleep mode, to load the position information with a stipulated correction value, in order to correct the position information with respect to an actual position of the closing element in an opening direction.

9. A non-transitory computer program product containing a program code which, when it is executed on a data processing device, carries out a method according to claim 1.

* * * * *